Patented Apr. 17, 1951

2,549,525

UNITED STATES PATENT OFFICE 2,549,525

MANUFACTURE OF EXTREME PRESSURE ADDITIVES FOR LUBRICATING OILS

Kenneth Charles Roberts, Clayton, Manchester, England, assignor to The Anchor Chemical Company Limited, Clayton, Manchester, England, a British company No Drawing. Application February 12, 1948, Serial No. 8,002. In Great Britain December 23, 1946

Section 1, Public Law 690, August 8, 1946
Patent expires December 23, 1966

2 Claims. (Cl. 260—399)

This invention relates to the manufacture of new materials for incorporation in mineral lubricating oils with a view to improving their performance under conditions of extreme pressure.

The use of sulphurised naturally-occurring animal, vegetable and fish oils as extreme pressure additives is well known but suffers from the limitation that even under the most favourable conditions only about 10% by weight of sulphur can be combined with the natural oils without rendering them incompatible with mineral lubricating oils. Combined sulphur is an operative component of extreme pressure additives of this type, and it is the object of the invention to provide sulphrised esters which contain increased proportions of combined sulphur and which will impart improved extreme pressure characteristics to lubricating oils.

According to my invention, non-gelatinised sulphurised products having a relatively high content of combined sulphur are prepared by reacting sulphur with unsaturated esters of mono- and dihydric aliphatic alcohols with the naturally occurring fatty acids containing 16 to 24 carbon atoms, in the presence of a dicyclohexylamine. For the purpose of my invention either the alcoholic or the acidic component of the ester or both may be unsaturated. Thus, unsaturated mono- and dihydric aliphatic alcohols may be combined with either saturated or unsaturated fatty acids of the type specified or saturated aliphatic alcohols of the type specified may be combined with unsaturated fatty acids. The proportion of sulphur used may be appreciably greater than that used in the sulphurisation of the corresponding glycerides.

The sulphurised products obtained by this process possess those desirable physical and chemical characteristics of a sulphurised oil additive which are found in the corresponding sulphurised glycerides prepared by the method claimed in my copending application Serial No. 645,972, now Patent No. 2,450,384, including low corrosiveness due to their low content of free sulphur and relatively low viscosity. In addition, the new sulphurised products possess the further desirable characteristics of improved compatibility with mineral lubricating oils and a higher content of combined sulphur than is obtainable in liquid products made by sulphurising glycerides. Both these features lead to improved extreme pressure properties when the sulphurised esters are incorporated in lubricating oils.

The manner in which the invention is carried out will now be described by reference to some specific examples.

Example 1

The glycol ester of the acids of rape seed oil (100 parts by weight) in reaction with sulphur (20 parts by weight) and dicyclohexylamine (2 parts by weight) for 5 hours at 160° C. yielded a clear, deep red viscous liquid having a free sulphur content of only 0.3%, a total sulphur content of 15–16% and complete freedom from sulphurous odours. The product was also freely miscible with well-known grades of mineral oil. A 5% blend of this ester with a mineral oil had the relatively high Timken O. K. value of 60 lbs.

Example 2

The oleyl ester of rape seed acids (150 g.) containing dicyclohexylamine (3 g.) was treated at 165° C. with sulphur (30 g.). When the reaction mixture had been maintained at 160° C. for 6½ hours with constant stirring the product was a red oil having a free sulphur content of 0.2% and a viscosity at 200° F. of 336 Redwood No. 1 seconds.

Example 3

The allyl ester of rape seed acids (150 g.) was treated with dicyclohexylamine and sulphur as in Example 2. The resulting viscous red oil had a free sulphur content of 0.11% and a viscosity at 200° F. of 704 Redwood No. 1 seconds.

Example 4

Sperm oil, which for the purpose of my invention may be considered to consist essentially of unsaturated esters resulting from the combination of higher monohydric aliphatic alcohols with higher fatty acids. (400 g.) was treated for 7 hours at 180° C. with sulphur (50 g.) and dicyclohexylamine (10 g.). The product, which was a soft red wax at ordinary temperatures. had a free sulphur content of 0.25% and a viscosity at 200° F. of 120 Redwood No. 1 seconds. The Timken O. K. value of a standard mineral oil was raised from 18 to 30 on incorporation of 5% of this product.

Example 5

The triethylene glycol ester of soya fatty acids (150 g.) was treated with dicyclohexylamine and sulphur as in Examples 2 and 3. The resulting red oil had a free sulphur content of 2.14% and a viscosity at 200° F. of 252 Redwood No. 1 seconds.

Example 6

In similar manner to that used in the preceding examples, the ethyl ester of soya fatty acids was sulphurised to yield a relatively mobile red oil having a free sulphur content of 1.45% and a viscosity at 200° F. of 54 Redwood No. 1 seconds.

What I claim is:

1. In the production of extreme pressure additives for lubricating oils, the process which consists substantially in heating and reacting sulfur with an unsaturated ester of an aliphatic alcohol containing not more than two hydroxyl groups and naturally occurring fatty acids containing from 16 to 24 carbon atoms, in the presence of a small amount of a dicyclohexylamine, at a temperature within the range of from about 130° to 180° C., and recovering the resulting sulfurized product.

2. The process of claim 1 wherein sperm oil is used as the unsaturated ester component of the reaction.

KENNETH CHARLES ROBERTS.

REFERENCES CITED

The following references are of record in the file of this patent:

UNITED STATES PATENTS

| Number | Name | Date |
|---|---|---|
| 1,669,491 | Savage | May 15, 1928 |
| 2,152,185 | Gottesmann | Mar. 28, 1939 |
| 2,427,717 | Dearborn | Sept. 23, 1947 |